(No Model.)
H. P. KURTZ.
WINDMILL REGULATOR.
No. 461,185. Patented Oct. 13, 1891.
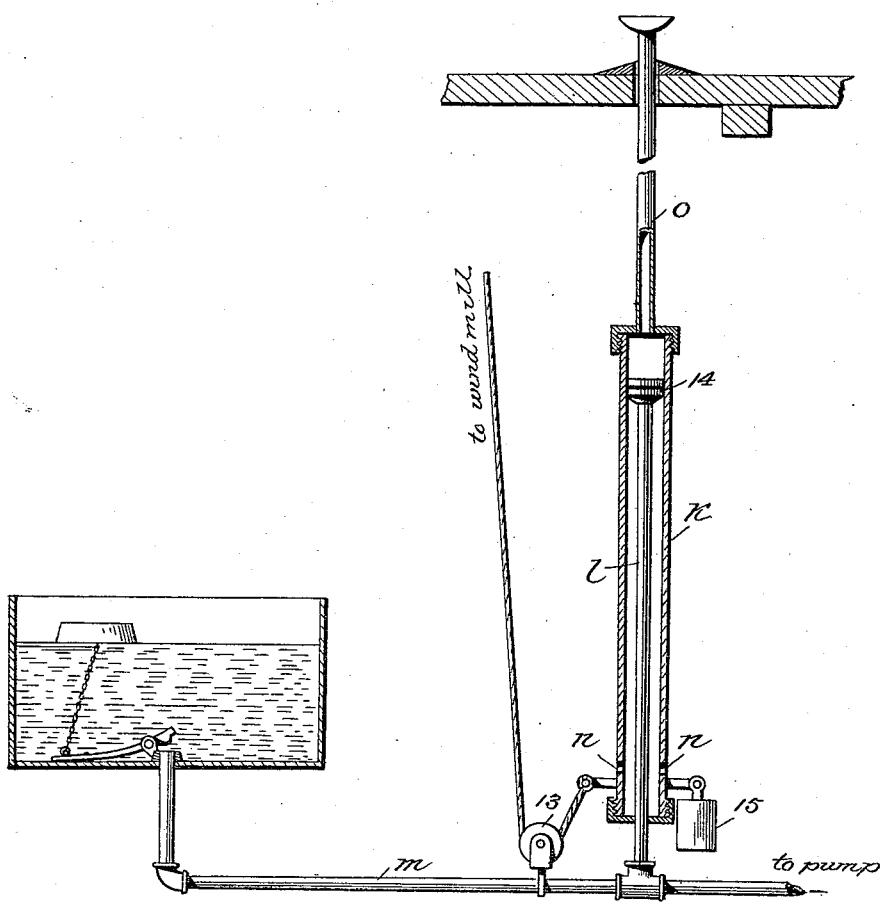
Attest
W. Allen Donaldson
J. L. Middleton
Inventor
Henry P. Kurtz
by E. W. Spear
Atty.

UNITED STATES PATENT OFFICE.

HENRY P. KURTZ, OF GOSHEN, INDIANA, ASSIGNOR OF ONE-HALF TO WILLIAM W. SHANNON AND JAMES T. SHAW, OF NEWARK, OHIO.

WINDMILL-REGULATOR.

SPECIFICATION forming part of Letters Patent No. 461,185, dated October 13, 1891.

Application filed December 10, 1890. Serial No. 374,224. (No model.)

*To all whom it may concern:*

Be it known that I, HENRY P. KURTZ, a citizen of the United States of America, residing at Goshen, in the county of Elkhart and State of Indiana, have invented certain new and useful Improvements in Windmills, of which the following is a specification.

My invention relates to regulators for windmill-engines.

The invention is shown in the accompanying drawing, in which the figure represents the regulator in connection with the tank, the connections to the windmill and pump being omitted.

Wind-engines are used for the greater part in connection with pumps for raising water into tanks, and in connection with said engines various means have been devised whereby they may be automatically turned out of the wind when the tank is filled. I have shown an improved mechanism for this purpose. At any convenient point, preferably under the platform, is a pipe connection $l$ with the water-pipe $m$, which conducts the water to the tank. This pipe $l$ is arranged vertically, and upon it slides the cylinder K, fitted snugly to the pipe $l$. The upper end of the pipe $l$ is open, and when the pipe $m$, leading to the tank, is closed by the ordinary float-valve the water is forced through the open end of the pipe $l$ into the cylinder K, which lifts the said cylinder. Attached to the lower end of the cylinder is the chain, wire, or rope which pulls the engine out of the wind, this being passed under the fixed pulley 13, and thence carried upward and attached to the cylinder-controlling part of the wind-wheel, so that the upward motion of the cylinder under the back-pressure of water pulls upon the chain, wire, or rope and puts the engine at rest. The upper end of the cylinder is provided with a tubular guide-pipe $o$, which passes up through the platform, or through any convenient structure, and steadies the cylinder in its movement. This pipe is closed at its upper end and opens into the cylinder at its lower end, and is filled with air which acts as a cushion to relieve the parts of shock when the pressure of water is suddenly thrown upon the cylinder. On the upper end of the pipe $l$ is a packing 14, fitting closely the cylinder and preventing any leakage. The cylinder is drawn down by a weight 15, which is sufficient to counteract the normal pressure of the water in the pipe, but yields under abnormal pressure when the discharge in the tank is closed.

The cylinder is provided, as shown at $n$, with perforations a short distance above the bottom, and in case the rope, chain, or wire should become detached or ruptured from any cause the back-pressure of water from the tank flowing through the pipe $l$ would raise the cylinder without relieving the pressure on account of the rupture of the rope 7; but as soon as the perforations $n$ had passed above the packing 14 the water would flow out through the perforations into the well.

I claim as my invention—

1. In combination with the chain, wire, or rope adapted to pull the wind-wheel out of the wind, a cylinder, a vertical pipe upon which said cylinder slides, said vertical pipe being in connection with the tank-pipe, having a valve, with a packing at the upper end of the vertical pipe, and perforations at the lower end of the cylinder, substantially as described.

2. In combination with the chain, wire, or rope arranged to pull the wind-wheel out of the wind, the cylinder sliding on a vertical pipe which is in connection with the pipe leading to the tank, said cylinder being perforated at its lower end and having at its upper end a hollow guide-rod forming an air-chamber, substantially as described.

In testimony whereof I affix my signature in presence of two witnesses.

HENRY P. KURTZ.

Witnesses:
W. A. CHANNELL,
CHAS. H. FOLLETT.